United States
Erickson

[15] 3,650,629
[15] Mar. 21, 1972

[54] SPLIT IMAGE, DUAL SPECTRUM OPTICAL SCANNING SYSTEM

[72] Inventor: John G. Erickson, Forth Worth, Tex.
[73] Assignee: Texas Instruments Incorporated, Dallas, Tex.
[22] Filed: June 3, 1970
[21] Appl. No.: 43,053

[52] U.S. Cl. .................................................356/74, 350/7
[51] Int. Cl. ....................................G01j 3/00, G02b 17/00
[58] Field of Search ..............356/74; 350/7, 171, 172, 174, 350/285

[56] References Cited

UNITED STATES PATENTS 3,211,046  10/1965  Kennedy.....................................350/7
3,495,029  2/1970  Underhill..............................350/171

OTHER PUBLICATIONS

A Telescope Suitable for Rocket-Borne Instrumentation; P. H. Verdone, Applied Optics, Vol. 6, No. 3; March 1967; pg. 570 & 571.

Primary Examiner—Ronald L. Wibert
Assistant Examiner—V. P. McGraw
Attorney—Samuel M. Mims, Jr., James O. Dixon, Andrew M. Hassell, Harold Levine and Rene E. Grossman

[57] ABSTRACT

A split image, dual spectrum optical scanning system includes a rotating multi-sided mirror for receiving radiant energy and for dividing the energy into split images. The split images are reflected through equal and opposite relay mirror systems to a Cassegrain type optical system, which converges the split images into a narrow envelope. An angularly extending dichroic mirror reflects the ultraviolet/visible portions of the split images out of the envelope to an ultraviolet/visible detector. The dichroic mirror also passes the infrared portions of the split images to an angularly extending mirror that reflects the infrared portions to an infrared detector.

6 Claims, 1 Drawing Figure

Patented March 21, 1972
3,650,629
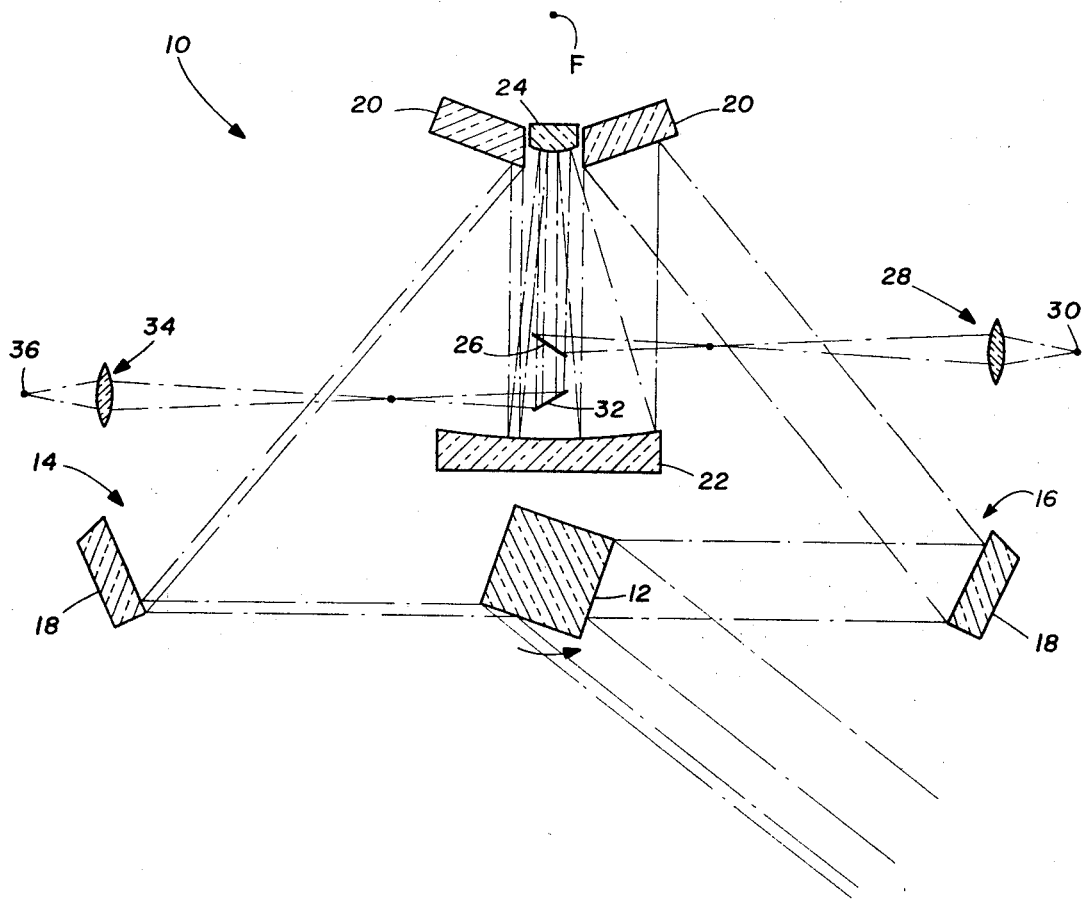
INVENTOR
JOHN G. ERICKSON
ATTORNEY

SPLIT IMAGE, DUAL SPECTRUM OPTICAL SCANNING SYSTEM

This invention relates to a split image, dual spectrum optical scanning system, and more particularly to an optical scanning system for use in airborne infrared and ultraviolet/visual imaging systems.

Airborne imaging systems are used in both military and industrial applications to obtain topographical data relating to particular geographic areas. In military applications, these systems are used to obtain data relating to areas that are otherwise inaccessible, either because they are controlled by hostile forces or because they are physically inaccessible. In industrial applications, airborne imaging systems are used in such diverse fields as agriculture, forestry, geography, geology, hydrology, and oceanography to obtain topographical data more economically and more rapidly than is possible by other methods.

In most airborne imaging systems, an optical scanning system is used to collect energy radiated upwardly from the earth and to focus the energy onto one or more detectors. Both the operating characteristics and the performance of an imaging system of this type are directly related to the design of its optical scanning system. For this reason, research directed toward the improvement of airborne imaging systems has resulted in the development of a variety of optical scanning systems. These include whole image systems, split image systems and split image, dual spectrum systems.

In a typical whole image optical scanning system, a wedge-shaped scanning mirror is rotated about an axis extending parallel to the surface of the earth. Energy radiating upwardly from the earth is reflected by the scanning mirror onto a collecting mirror. The collecting mirror in turn focuses the energy onto a detector.

Whole image scanning systems of the wedge-shaped scanning mirror type provide a constant optical aperture. This is important, because a constant optical aperture is essential to the production of a high quality output in an aircraft imaging system. However, whole image scanning systems also exhibit certain inherent disadvantages. For example, whole image scanning systems of the wedge-shaped scanning mirror type are generally characterized by low scanning rates. When such a system is employed in an airborne imaging system, this characteristic necessitates the rotation of the wedge-shaped scanning mirror at a very high speed. High speed rotation of the scanning mirror produces centrifugal forces that tend to distort the mirror, which in turn distorts the output of an airborne imaging system.

The inherent disadvantages of whole image optical scanning systems led to the development of the split image optical scanning system disclosed and claimed in U.S. Pat. No. 3,211,046 granted to Howard V. Kennedy on Oct. 12, 1965, and assigned to Texas Instruments Incorporated. In accordance with the Kennedy invention, a multisided scanning mirror is rotated about an axis extending approximately parallel to the surface of the earth. The multisided scanning mirror divides energy radiating upwardly from the earth into two "split images." The split images are reflected through equal and opposite relay mirror systems, and are recombined in a detector.

The use of a split image optical scanning system in an airborne imaging system results in several advantages over the use of a whole image system. For example, because of its smaller size, the multisided scanning mirror of a split image system is not distorted by centrifugal forces. More importantly, split image optical scanning systems achieve a phenomenon known as optical doubling, and therefore operate at a considerably higher scanning rate than is possible with whole image scanning systems. This split image optical scanning system disclosed in the above-identified Kennedy Patent also maintains the constant optical aperture that is characteristic of the prior wedge-shaped scanning mirror type whole image optical scanning system.

The above-identified Kennedy patent also discloses a split image, dual spectrum optical scanning system. In the latter system, the split images formed by the multisided scanning mirror are reflected onto a dichroic mirror. The dichroic mirror passes the portions of the split images having wavelengths in the infrared spectrum to an infrared detector, and reflects the portions of the split images having wavelengths in the ultraviolet/visible spectrum to an ultraviolet/visible detector. The infrared and ultraviolet/visible portions of the split images are recombined in the infrared and ultraviolet/visible detectors, respectively, so that the split image, dual spectrum optical scanning system simultaneously produces both infrared and ultraviolet/visible outputs. Preferably, the detectors are so positioned that energy radiated from a particular point on the earth is simultaneously received by both detectors.

Unfortunately, the split image, dual spectrum optical scanning systems developed heretofore have not provided the constant optical aperture that is characteristic of whole image and split image scanning systems. In a typical prior split image, dual spectrum system, this deficiency is caused by the positioning of the supporting structure for the ultraviolet/visible detector in the path of portions of the split images as the split images are reflected through the system. This causes the energy received by the detectors of the system to vary with the position of the multisided scanning mirror. That is, because portions of the split images are blocked, the optical aperture of the system changes during the rotation of the multisided mirror.

The present invention relates to a split image, dual spectrum optical scanning system which provides a constant optical aperture, and which is therefore superior to prior split image, dual spectrum scanning systems for use in airborne imaging systems. In accordance with the preferred embodiment of the invention, a Cassegrain type optical system is employed to focus split images onto an angularly extending dichroic mirror, which reflects the ultraviolet/visible portions of the split images to an ultraviolet/visible detector positioned laterally of the scanning system. The dichroic mirror also passes the infrared portions of the images to an angularly extending mirror, which reflects the infrared portions of the images to an infrared detector also positioned laterally of the scanning system. No portion of either of the split images is blocked as the split images are reflected through the scanning system, and the system therefore provides a constant optical aperture.

A more complete understanding of the invention may be had by referring to the following detailed description when taken in conjunction with the drawing, wherein a split image, dual spectrum optical scanning system employing the present invention is schematically illustrated.

Referring now to the drawing, a split image, dual spectrum optical scanning system 10 employing the present invention is shown. The scanning system 10 includes a rotating multisided scanning mirror 12 which receives energy radiating upwardly from the earth and divides the energy into split images. In the embodiment shown in the drawing, the mirror 12 is a four-sided mirror. It will be understood, however, that the mirror 12 may comprise three, four, or more sides in accordance with the requirements of a particular application.

The split image, dual spectrum optical scanning system 10 further includes a pair of equal and opposite relay mirror systems 14 and 16, each including a first folding mirror 18 and a second folding mirror 20. The relay mirror systems 14 and 16 reflect the split images generated by the scanning mirror 12 onto an ellipsoidal primary mirror 22 which converges the split images toward a focal point F. The converging split images are then reflected back toward the primary mirror 22 by a spheroidal secondary mirror 24.

The mirrors 22 and 24 comprise a Cassegrain type optical system which converges the split images formed by the scanning mirror 12 into a narrow envelope centered on the optical axes of the mirrors 22 and 24. A dichroic mirror 26 is positioned in the envelope, and therefore receives the split images from the secondary mirror 24. The dichroic mirror 26 extends angularly relative to the envelope and reflects the portions of the split images in the ultraviolet/visible spectrum through a suitable relay lens system 28 to an ultraviolet/visible detector 30 positioned laterally of the scanning system 10. The detector 30 receives the ultraviolet/visible portions of both of the split images, and produces an output indicative of the intensity of the ultraviolet/visible portion of the radiation received by the scanning mirror 12.

The dichroic mirror 26 also passes the portions of the split images in the infrared spectrum to an angularly extending mirror 32. The mirror 32 reflects the infrared portions of the split images through a suitable relay lens system 34 to an infrared detector 36 also positioned laterally of the scanning system 10. The infrared detector 36 receives the infrared portions of both of the split images, and produces an output indicative of the intensity of the infrared portions of all of the radiation received by the scanning mirror 12.

Assuming that the multisided scanning mirror 12 of the split image, dual spectrum optical scanning system 10 rotates in a counterclockwise direction, the split image received by a relay mirror system 16 from the scanning mirror 12 varies from minimum to maximum during rotation of the mirror 12, and the split image received by the relay mirror system 14 varies from maximum to minimum. However, this maximizing-minimizing effect is equal and opposite in the mirror systems 14 and 16 and is cancelling in nature, so that the total energy transmitted from the mirror 12 to the detectors 30 and 36 is constant. As is clearly indicated by the dashed lines in the drawings, the mirrors 26 and 32 are positioned within the paths of the split images as the split images are reflected through the scanning system 10. That is, no portion of either of the split images is blocked as the split images are reflected through the scanning system 10 from the scanning mirror 12 to the detectors 30 and 36. The scanning system 10 therefore provides a constant aperture, because the detectors 30 and 36 continuously receive all of their respective portions of the energy received from the scanning mirror 12.

The detectors 30 and 36 preferably comprise conventional radiation detector systems. In accordance with particular requirements, the detector 30 may be responsive to the entire ultraviolet/visible spectrum, to the ultraviolet spectrum only, to the visible spectrum only, or to a specific portion of either the ultraviolet spectrum or the visible spectrum. Furthermore, the outputs necessary in certain applications of the scanning system 10 may require the use of a detector 30 responsive to the short wavelength portions of the infrared spectrum. Similarly, the detector 36 may be responsive to the entire infrared spectrum or to specific portions thereof, as required.

The use of the present invention is advantageous over the prior art for several reasons. First, the system provides a constant optical aperture, which is virtually essential to the high quality performance of airborne imaging systems. Second, the system provides a dual spectrum output, which is invaluable in many of the military and industrial applications of airborne imaging systems. Third, the system permits the positioning of detectors laterally of the system proper. This facilitates both the use of detectors of any convenient size and the interchanging of the detectors to permit the detection of specific wavelengths within the infrared spectrum and within the ultraviolet/visible spectrum.

Although a specific embodiment of the invention is illustrated in the drawing and described herein, it will be understood that the invention is not limited to the embodiment disclosed, but is capable of rearrangement, modification and substitution of parts and elements without departing from the spirit of the invention.

What is claimed is:

1. A split image, dual spectrum optical scanning system comprising:
   a multi-sided mirror and means for rotating the multi-sided mirror about an axis extending longitudinally through the mirror,
   a concave mirror-convex mirror optical system for converging the split images into an envelope and equal and opposite mirror relay systems for reflecting the split images from the rotating multi-sided mirror to the concave mirror-convex mirror optical system, and
   a dichroic mirror mounted in the envelope between the converging split images for passing predetermined portions of the split images and for reflecting other portions of the split images out of the envelope and means mounted beyond the dichroic mirror for reflecting the predetermined portions of the split images out of the envelope.

2. The split image, dual spectrum optical scanning system according to claim 1 wherein the dichroic mirror and the reflecting means reflect their respective portions of the split images to detectors positioned laterally of the scanning system.

3. A split image, dual spectrum optical scanning system comprising:
   a rotating multi-sided mirror for receiving radiated energy and for dividing the radiated energy into split images,
   means for directing the split images along a path, said means including a Cassegrain type optical system comprising a concave primary mirror and a convex secondary mirror wherein the concave primary mirror converges the split images toward a focal point,
   a dichroic mirror mounted in the path between the converging split images and extending angularly with respect thereto for reflecting predetermined portions of the split images out of the path to a detector positioned laterally of the scanning system,
   a mirror mounted in the path and extending angularly with respect thereto for reflecting the other portions of the split images out of the path to a second detector positioned laterally of the scanning system.

4. The split image, dual spectrum optical scanning system according to claim 3 further including relay lens systems for focusing the predetermined portions and the other portions of the split images on the detector and the second detector respectively.

5. In a split image optical scanning system of the type including a rotating multi-sided mirror for dividing received radiant energy into split images, equal and opposite relay mirror systems for receiving the split images from the multi-sided mirror and a first curved concave mirror for receiving the split images from the relay mirror systems and for converging the split images toward a focal point, the improvement comprising:
   a second curved convex mirror for receiving the split images from the first curved concave mirror and for converging the split images into a narrow envelope, wherein the first curved mirror and the second curved mirror comprises a Cassegrain type optical system,
   a dichroic mirror, extending angularly with respect to the envelope and positioned between the converging paths of the split images, for receiving the split images from the second curved mirror and for reflecting predetermined portions of the split images out of the envelope, and
   a mirror extending angularly with respect to the envelope for receiving other portions of the split images from the second curved mirror and for reflecting the other portions of the split images.

6. The split image optical scanning system according to claim 5 further including a pair of detectors, a relay lens system for receiving the predetermined portions of the split images from the dichroic mirror and for focusing the predetermined portions of the split images on one of the detectors, and a relay lens system for receiving the other portions of the split images and for focusing the other portions of the split images on the other of the detectors.

* * * * *